UNITED STATES PATENT OFFICE.

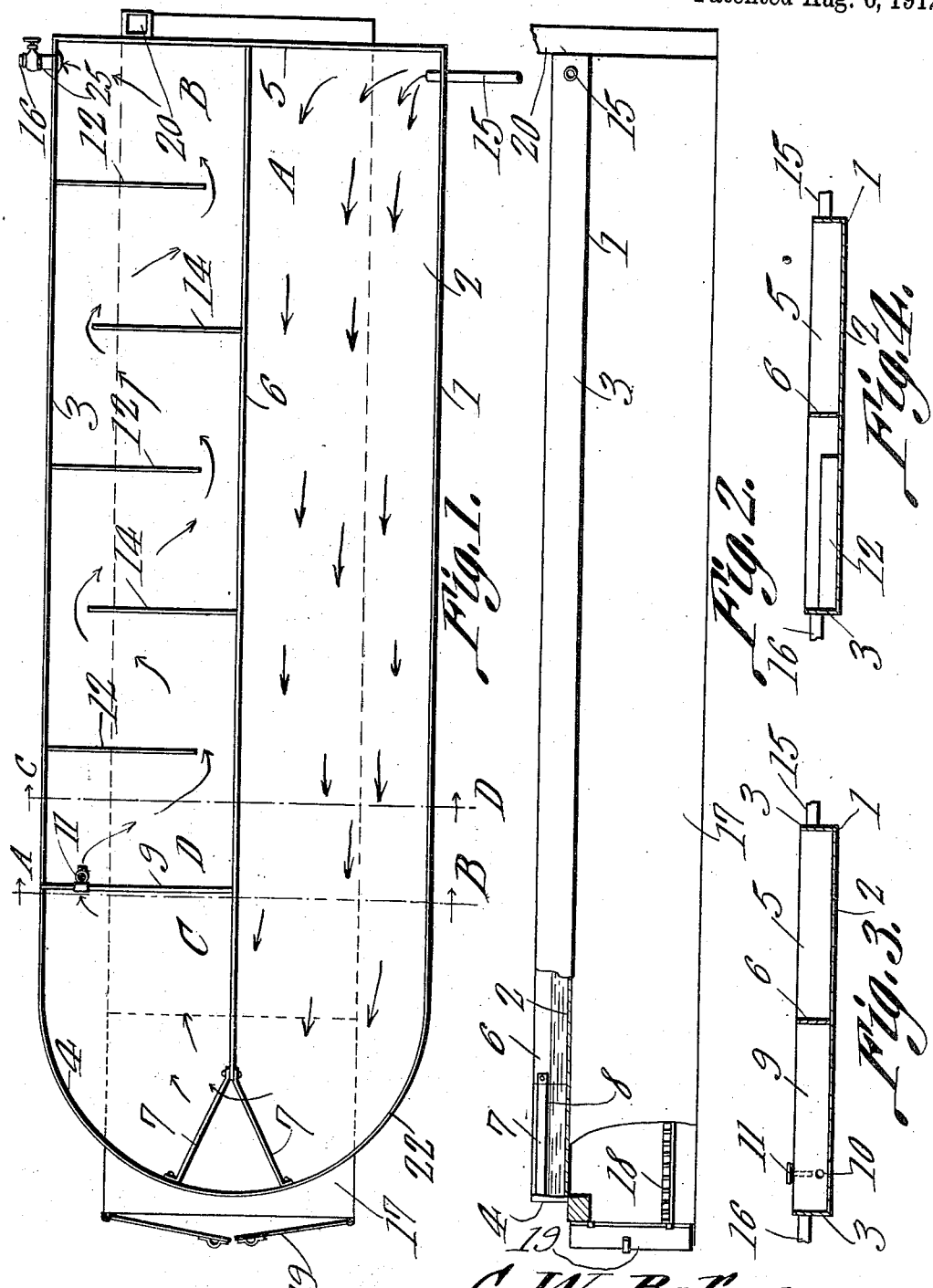

GEORGE W. BAKER, OF COLMESNEIL, TEXAS.

SYRUP-PAN.

1,034,407.  Specification of Letters Patent.  Patented Aug. 6, 1912.

Application filed December 5, 1910. Serial No. 595,705.

*To all whom it may concern:*

Be it known that I, GEORGE W. BAKER, a citizen of the United States, residing at Colmesneil, in the county of Tyler and State of Texas, have invented a new and useful Syrup-Pan, of which the following is a specification.

It is the object of this invention to provide a pan adapted to be used in boiling down sap and the like, the pan being so constructed that any sediment which is in the material being boiled down, will be prevented from flowing toward the outlet of the pan.

Another object of the invention is to provide a pan in which the process may be carried forward without endangering the material through burning.

Another object of the invention is to provide a pan so constructed that when the heat is applied thereto, the circulation in the pan, caused by the application of the heat thereto, will tend to hold back any sediment which is in the material being treated in the pan.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings, Figure 1 is a top plan; Fig. 2 is a side elevation parts being broken away; Fig. 3 is a transverse section on the line A—B of Fig. 1; and Fig. 4 is a transverse section on the line C—D of Fig. 1.

The pan 1 includes a bottom 2 and a circumscribing wall 3, the wall 3 being curved at one end as denoted by the numeral 4 and being rectangularly disposed at the other end, as denoted by the numeral 5.

A longitudinally extending division plate 6 is provided, and this division plate 6 is in contact with the bottom 2 of the pan, and with the end wall 5 thereof. At one end, however, the division plate 6 is spaced at some distance from the curved end wall 4. A pair of plates 7 are secured at their inner ends to the division plate 6, and at their outer ends to the curved end wall 4 of the pan. These plates 7 serve as braces for the division plate 6. By referring to Fig. 2 of the drawing, it will be seen that the brace plates 7 at their lower edges, are spaced, as denoted by the numeral 8, from the bottom 2 of the pan 1, so that the sap may pass beneath the plates.

A transverse barrier plate 9 is provided, this plate 9 being in contact with the bottom 2 of the pan, with one side wall of the pan, and with the division plate 6. The longitudinally extended division plate 6 serves to separate the pan 1 into compartments A and B, the compartment B, in its turn, being sub-divided into compartments C and D by the transverse barrier plate 9. In the transverse barrier plate 9 there is an opening 10, forming a communication between the compartments C and D, this opening 10 being controlled by a valve 11, of any desired construction.

In the compartment D, a plurality of transverse baffle plates 12 and 14 are mounted, the baffle plates 12 projecting inwardly from one side wall of the pan, while the baffle plates 14 project outwardly from the longitudinally extending division plate 6.

Located adjacent the end wall 5 of the pan is an inlet 15, communicating with the compartment A. Located upon the opposite side of the longitudinally extended division plate 6, and communicating with the compartment D is an outlet 16, having a valve 25.

The invention further includes a heater 17, the grate whereof is denoted by the numeral 18, the stoke doors by the numeral 19, and the stack by the numeral 20.

The operation of the device is as follows: The compartments A and C are filled with sap, to the depth of, say, two or three inches, the compartment D being filled with water, to prevent the pan from burning, the valves 11 and 25 being closed. A fire is then built in the heater 17, upon the grate 18, should a grate 18 be employed. In any event, the heat will be greater adjacent the stoke doors 19 than adjacent the stack 20. By this construction, any sediment which is in the sap in the compartments A and C will be forced backwardly toward the end wall 5, owing to the fact that the maximum degree of heat is applied to the pan adjacent the end wall 4. The sediment, accumulating about the inlet 15, may be skimmed off from time to time.

After the sap has been boiled sufficiently in the compartments A and C, so that it is partly concentrated, the process being continued until all of the sediment in the sap has accumulated about the inlet 15, the valve 25 in the outlet 16 is opened, permitting the water in the compartment C to flow away. The valve 11 is then opened, permitting the partially concentrated sap in the compartments A and C to flow into the compartment D, whereupon the valves 11 and 25 are closed, and a further supply of fresh sap is admitted to the compartments A and C.

The sap, being thoroughly skimmed by the process above mentioned, and being imprisoned in the compartment D, is concentrated to the desired extent in the compartment D, whereupon the valve 25 is opened, permitting the finished product to pass out of the outlet 16, the process above described being carried on as long as the supply of sap may warrant.

The device is so constructed that one person may handle the same, unaided, a highly concentrated product, free from sediments, being produced, with a minimum amount of attention during the operation.

Owing to the fact that the wall 4 is curved as shown at 22, the sediment in the sap will be deflected rearwardly, and be prevented from finding lodgment in the end of the pan to which the maximum degree of heat is applied.

After the sap has passed from the compartment A into the compartment C, that portion of the division plate 6 which protrudes beyond the barrier 9 toward the curved end wall 4, will serve to prevent the sap from which the sediment has been removed, from finding its way backward, to any appreciable extent, into the compartment A.

Having thus described the invention, what is claimed is:—

An evaporator comprising a pan; a longitudinally extended division plate secured to one end wall of the pan and spaced from the other end wall of the pan, the last named end wall being curved; plates spaced from the bottom of the pan and diverging from the free end of the division plate into union with the curved end wall of the pan, said plates being radially disposed with respect to the curved end wall; a transverse barrier connecting the intermediate portion of the division plate with one side wall of the pan, the barrier being provided with a valve-controlled passage; an inlet for the pan, and an outlet therefor, located upon opposite sides of the division plate, and both located adjacent the first named end wall of the pan; and means for supplying a maximum degree of heat beneath one end of the pan only and adjacent the longitudinal center only of the pan, adjacent the rounded end wall, whereby ebullition will take place adjacent the rounded end of the pan only, thereby to drive backwardly, away from the free end of the division plate, floating material in the liquid which is being concentrated.

In testimony that I claim the foregoing as my own, I have hereunto affixed my signature in the presence of two witnesses.

GEORGE W. BAKER.

Witnesses:
S. W. BAKER,
TOM STURROCK.

Copies of this patent may be obtained for five cents each, by addressing the "Commissioner of Patents, Washington, D. C."